(12) United States Patent  
Lahoti et al.

(10) Patent No.: US 8,108,550 B2  
(45) Date of Patent: Jan. 31, 2012

(54) REAL-TIME IDENTIFICATION OF AN ASSET MODEL AND CATEGORIZATION OF AN ASSET TO ASSIST IN COMPUTER NETWORK SECURITY

(75) Inventors: Ankur Lahoti, Lucknow (IN); Hui Huang, Sunnyvale, CA (US); Christian F. Beedgen, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 548 days.

(21) Appl. No.: 11/923,513

(22) Filed: Oct. 24, 2007

(65) Prior Publication Data

US 2008/0104276 A1 May 1, 2008

Related U.S. Application Data

(60) Provisional application No. 60/862,930, filed on Oct. 25, 2006.

(51) Int. Cl.  
*G06F 15/16* (2006.01)  
*G06F 15/173* (2006.01)

(52) U.S. Cl. ............... 709/238; 709/245; 707/E17.032

(58) Field of Classification Search .......... 709/221–222, 709/224–225, 238, 245; 707/4, E17.032, 707/7, E17.115; 726/22, 23, 25  
See application file for complete search history.

(56) References Cited

U.S. PATENT DOCUMENTS

| | | | |
|---|---|---|---|
| 6,108,699 A * | 8/2000 | Moiin | ............... 709/221 |
| 6,957,275 B1 | 10/2005 | Sekiguchi | |
| 7,260,844 B1 | 8/2007 | Tidwell et al. | |
| 7,325,059 B2 | 1/2008 | Barach et al. | |
| 7,337,910 B2 | 3/2008 | Cartmell et al. | |
| 7,376,969 B1 | 5/2008 | Njemanze et al. | |
| 2002/0138649 A1 | 9/2002 | Cartmell et al. | |
| 2004/0044791 A1* | 3/2004 | Pouzzner | .............. 709/245 |
| 2004/0199793 A1 | 10/2004 | Wilken et al. | |

(Continued)

FOREIGN PATENT DOCUMENTS

RU 97116465 11/1999

OTHER PUBLICATIONS

Ruiz-Sanchez, M.A., et al., "Survey and Taxonomy of IP Address Lookup Algorithms," IEEE Network, Mar./Apr. 2001, pp. 8-23, vol. 15, Issue 2.

(Continued)

*Primary Examiner* — Peling Shaw

(57) ABSTRACT

A unique identifier is assigned to a network node and is used to obtain an "asset model" corresponding to the node and to determine whether the node is a member of a particular category. An asset model is a set of information about a node (e.g., the node's role within the enterprise, software installed on the node, and known vulnerabilities/weaknesses of the node). An identifier lookup module determines a node's identifier based on characteristics of the node (such as IP address, host name, network zone, and/or MAC address), which are used as keys into lookup data structures. A category lookup module determines whether a particular node is a member of (i.e., within) a particular category using a transitive closure to model the categories (properties) that can be attached to an asset model. A transitive closure for a particular asset category is stored as a bitmap, similar to bitmap indexing.

15 Claims, 7 Drawing Sheets

U.S. PATENT DOCUMENTS

| | | | |
|---|---|---|---|
| 2004/0230696 A1* | 11/2004 | Barach et al. | 709/238 |
| 2006/0159087 A1 | 7/2006 | Ono | |
| 2006/0176822 A1 | 8/2006 | Doyle et al. | |
| 2007/0203909 A1* | 8/2007 | Marathe | 707/7 |

OTHER PUBLICATIONS

Wu, K., et al., "Optimizing Bitmap Indices with Efficient Compression," ACM Transactions on Database Systems, Mar. 2006, pp. 1-38, vol. 31, No. 1.

Wikibooks, "Data Structures/Hash Tables," Last Modified Aug. 13, 2008, [online] [Retrieved on Aug. 25, 2008] Retrieved from the internet <URL: http://en.wikibooks.org/wiki/Data_Structures/Hash_Tables>.

PCT International Search Report and Written Opinion, PCT/US07/82562, Jun. 12, 2008, 9 pages.

Official Action for Russia Patent Application No. 2009107080, Apr. 5, 2010, 10 pages.

Supplementary European Search Report for European Patent Application No. EP 07868580.7, Jun. 9, 2010, 6 Pages.

Kessler, G., "Setting Up Your Own DNS," Mar. 1996, pp. 1-11, [online] [Retrieved on May 19, 2010] Retrieved from the Internet <URL: http://www.garykessler.net/library/dns.html>.

Allison, L. ~ Lookup Tables ~ Aug. 2006 ~ 10 pages ~Retrieved from the Internet ~ http://www.csse.monasg.edu.au/{lloyd/tildeAlgDS/Table/>.

New Zealand Intellectuai Property Office ExamEnatlet1 Report ~ New Zealand Patent Application No. 574566 ~ Oct. 26, 2010 ~ 1 page.

Russian Patent Office Decision on Grant ~ Russian Application No. 2009107080 ~ Sep. 23, 2010 ~ 17 pages.

Singapore Intellectual Property Office Examination Report ~ Singapore Patent Application No. 200901118-0 ~ Oct. 22, 2010 ~ 6 pages.

* cited by examiner

REAL-TIME IDENTIFICATION OF AN ASSET MODEL AND CATEGORIZATION OF AN ASSET TO ASSIST IN COMPUTER NETWORK SECURITY

CROSS-REFERENCE TO RELATED APPLICATION

This application claims the benefit of U.S. Provisional Application No. 60/862,930, filed Oct. 25, 2006, which is hereby incorporated by reference herein in its entirety.

BACKGROUND

1. Field of the Invention

This invention pertains in general to security information/event management (SIM or SIEM) and in particular to accessing a model of a network node (e.g., the node targeted by an event) so that the model data can be used in conjunction with security information/events.

2. Description of the Related Art

The field of security information/event management (SIM or SIEM) is generally concerned with 1) collecting data from networks and networked devices that reflects network activity and/or operation of the devices and 2) analyzing the data to enhance security. For example, the data can be analyzed to identify an attack on the network or a networked device and determine which user or machine is responsible. If the attack is ongoing, a countermeasure can be performed to thwart the attack or mitigate the damage caused by the attack. The data that is collected usually originates in a message (such as an event, alert, or alarm) or an entry in a log file, which is generated by a networked device.

The message or entry usually indicates one or more computer network devices ("network nodes") that are involved in the network activity. For example, the message or entry might indicate the node to which the activity was directed (the "target node") and/or the node from which the activity originated (the "source node"). While it is possible to identify and investigate an attack using only the collected data, it is often helpful to have additional information such as information about the indicated network nodes.

Information about a network node, referred to as an "asset model," can include, for example, the node's Internet Protocol (IP) address, the node's host name, the network to which the node belongs, the node's role within the enterprise, an open port on the node, software installed on the node (e.g., operating system and applications), and known vulnerabilities or weaknesses of the node (called "exposed vulnerabilities").

Asset models are accessed during security analysis. Security analysis can be performed in either batch mode or in real-time. In batch mode, when security information/events are received, they are stored. Later, the stored security information/events are analyzed. In real-time mode, when security information/events are received, they are analyzed in real-time or near real-time.

In order for security analysis to take place in real-time (or near real-time), the asset models must be accessed in real-time (or near-real time). This is very difficult to achieve, since thousands of events are generated per minute, and each event indicates one or more nodes. For example, an event rate of 5,000 events/second and 4 nodes/event results in 20,000 nodes/second. For each node, its asset model is identified and accessed.

What is needed is a way to access an asset model in an efficient manner so that the asset model can be used in real-time in conjunction with security information/events.

BRIEF SUMMARY OF THE INVENTION

A manager receives one or more events and analyzes the events to detect attacks. An event describes an action involving a computer network device, called a "network node." An event includes a reference, called a "node reference," to one or more nodes (e.g., the node to which the action was directed (the "target node") and/or the node from which the action originated (the "source node")). A node reference includes multiple fields, such as Internet Protocol (IP) address, network zone, hostname, Media Access Control (MAC) address, and asset identifier (assetID).

The assetID field is intended to store a unique identifier (ID) that is assigned to a network node. When an event is first received by the manager, the assetID field of a node reference is empty. Later, an identifier corresponding to the node's "asset model" is stored in the assetID field. The ID is used to obtain the asset model corresponding to the network node associated with the ID and to determine whether the network node is a member of a particular category. The manager accesses a network node's asset model in order to perform security analysis.

An asset model is a set of information about a network node. This information can include, for example, the node's IP address, the node's host name, the network to which the node belongs, the node's role within the enterprise, an open port on the node, software installed on the node (e.g., operating system and applications), and a list of known vulnerabilities or weaknesses of the node, called "exposed vulnerabilities."

The manager includes an identifier module and a category module. The identifier module provides functionality related to the unique ID that is assigned to a network node and includes a lookup module and a management module. The lookup module determines a network node's ID based on various characteristics of the network node, such as IP address, host name, network zone, and/or Media Access Control (MAC) address. These pieces of information are used as keys into one or more lookup data structures (e.g., lookup tables). If a lookup is successful (e.g., a value is found that is associated with the key), then that value (which is the ID of the node's asset model) is returned. The management module tracks which IDs have been assigned to network nodes and which IDs have not.

The category module provides functionality related to categories and includes a lookup module and a management module. The lookup module determines whether a particular network node (asset) is a member of (i.e., within) a particular category. In order to make this determination, the category module uses category data. Category data uses a transitive closure (TC) to model a hierarchical and dynamic space of categorization (properties) that can be attached to an asset model. The TC is stored in memory as a set of bitmaps, where a bitmap corresponds to a particular asset category or group. A 0/1 bit in a bitmap represents whether there is a link between the particular asset category/group and an asset. An asset's unique ID serves as an index into a transitive closure bitmap. The management module updates category data as necessary.

Figure 1:
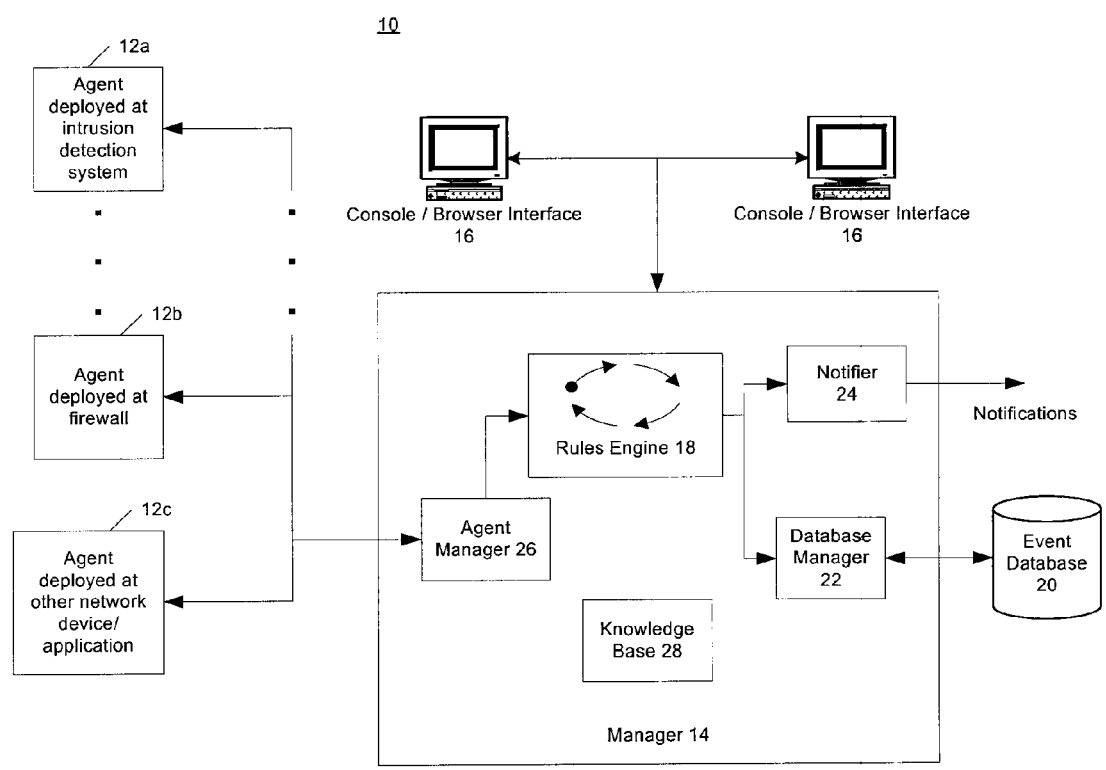
FIG. 1 is a high-level diagram illustrating an environment having a security information/event management system according to one embodiment.

The figures depict an embodiment for purposes of illustration only. One skilled in the art will readily recognize from the following description that alternative embodiments of the structures and methods illustrated herein may be employed without departing from the principles described herein.

DETAILED DESCRIPTION OF THE EMBODIMENTS

Described herein is a computer-based system for capturing security events from heterogeneous sources, normalizing such events to a common schema and cross-correlating such normalized events with rules to create meta-events. The system (one embodiment of which is manifest as computer software) enables aggregation, correlation, detection, and investigative tracking of suspicious network activities from multiple security devices. The present system also supports response management, ad-hoc query resolution, reporting and replay for forensics analysis, and graphical visualization of network threats and activity.

Although the present system will be discussed with reference to various illustrated examples, these examples should not be read to limit the broader spirit and scope of the present invention. For example, the examples presented herein describe distributed agents, managers and consoles, which are but one embodiment of the present invention. The general concepts and reach of the present invention are much broader and may extend to any computer-based or network-based security system. Also, examples of the messages that may be passed to and from the components of the system and the data schemas that may be used by components of the system are given in an attempt to further describe the present invention, but are not meant to be all-inclusive examples and should not be regarded as such.

Some portions of the detailed description that follows are presented in terms of algorithms and symbolic representations of operations on data within a computer memory. These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

As indicated above, one embodiment of the present invention is instantiated in computer software, that is, computer readable instructions, which, when executed by one or more computer processors/systems, instruct the processors/systems to perform the designated actions. Such computer software may be resident in one or more computer readable media, such as hard drives, CD-ROMs, DVD-ROMs, read-only memory, read-write memory and so on. Such software may be distributed on one or more of these media, or may be made available for download across one or more computer networks (e.g., the Internet). Regardless of the format, the computer programming, rendering and processing techniques discussed herein are simply examples of the types of programming, rendering and processing techniques that may be used to implement aspects of the present invention. These examples should in no way limit the present invention, which is best understood with reference to the claims that follow this description.

System Architecture

FIG. 1 is a high-level diagram illustrating an environment having a security information/event management system 10 according to one embodiment. System 10 includes agents 12, one or more managers 14 and one or more consoles 16 (which may include browser-based versions thereof). In some embodiments, agents, managers and/or consoles may be combined in a single platform or distributed in two, three or more platforms (such as in the illustrated example). The use of this multi-tier architecture supports scalability as a computer network or system grows.

Agents 12 are software programs that provide efficient, real-time (or near real-time) local event data capture and filtering from a variety of network security devices and/or applications. The primary sources of security events are common network elements including firewalls, intrusion detection systems and operating system logs. Agents 12 can collect events from any source that produces event logs or messages and can operate at the native device, at consolidation points within the network, and/or through simple network management protocol (SNMP) traps.

Agents 12 are configurable through both manual and automated processes and via associated configuration files. Each agent 12 may include one or more software modules including a normalizing component, a time correction component, an aggregation component, a batching component, a resolver component, a transport component, and/or additional components. These components may be activated and/or deactivated through appropriate commands in the configuration file.

Managers 14 are server-based components that further consolidate, filter and cross-correlate events received from the agents, employing a rules engine 18 and a centralized event database 20. One role of manager 14 is to capture and store all of the real-time and historic event data to construct (via database manager 22) a complete, enterprise-wide picture of security activity. The manager 14 also provides centralized administration, notification (through one or more notifiers 24), and reporting, as well as a knowledge base 28 and case management workflow. The manager 14 may be deployed on any computer hardware platform and one embodiment utilizes a relational database management system such as an Oracle™ database to implement the event data store component. Communications between manager 14 and agents 12 may be bi-directional (e.g., to allow manager 14 to transmit commands to the platforms hosting agents 12) and encrypted. In some installations, managers 14 may act as concentrators for multiple agents 12 and can forward information to other managers (e.g., deployed at a corporate headquarters).

The manager 14 includes one or more agent managers 26, which are responsible for receiving the event data messages transmitted by the agents 12. Where bi-directional communication with the agents 12 is implemented, these agent managers 26 may be used to transmit messages to the agents 12. If encryption is employed for agent-manager communications (which is optional), the agent manager 26 is responsible for decrypting the messages received from agents 12 and encrypting any messages transmitted to the agents 12.

Consoles 16 are computer- (e.g., workstation-) based applications that allow security professionals to perform day-to-day administrative and operation tasks such as event monitoring, rules authoring, incident investigation and reporting. Access control lists allow multiple security professionals to use the same system and event database, with each having their own views, correlation rules, alerts, reports and knowledge base appropriate to their responsibilities. A single manager 14 can support multiple consoles 16.

In some embodiments, a browser-based version of the console 16 may be used to provide access to security events, knowledge base articles, reports, notifications and cases. That is, the manager 14 may include a web server component accessible via a web browser hosted on a personal or handheld computer (which takes the place of console 16) to provide some or all of the functionality of a console 16. Browser access is particularly useful for security professionals that are away from the consoles 16 and for part-time users. Communication between consoles 16 and manager 14 is bi-directional and may be encrypted.

Through the above-described architecture the system can support a centralized or decentralized environment. This is useful because an organization may want to implement a single instance of system 10 and use an access control list to partition users. Alternatively, the organization may choose to deploy separate systems 10 for each of a number of groups and consolidate the results at a "master" level. Such a deployment can also achieve a "follow-the-sun" arrangement where geographically dispersed peer groups collaborate with each other by passing primary oversight responsibility to the group currently working standard business hours. Systems 10 can also be deployed in a corporate hierarchy where business divisions work separately and support a rollup to a centralized management function.

Security information/event management system 10 is further described in U.S. application Ser. No. 10/308,415, filed Dec. 2, 2002, which is hereby incorporated by reference herein in its entirety.

Introduction to Asset Models

A manager 14 receives one or more events and analyzes the events to detect attacks. An event describes an action involving a computer network device, called a "network node." Exemplary network nodes include laptop or desktop computers, servers (such as electronic mail servers, access control servers, and domain name system (DNS) servers), firewalls, routing devices, intrusion detection systems, virtual private network (VPN) systems, and printers.

In one embodiment, an event indicates one or more nodes (e.g., the node to which the action was directed (the "target node") and/or the node from which the action originated (the "source node")). In this embodiment, the event includes a reference to each node (called a "node reference"). A node reference includes multiple fields, such as Internet Protocol (IP) address, network zone, hostname, Media Access Control (MAC) address, and asset identifier (assetID), (A network zone is a network segment. A label identifies a network zone and is used to distinguish private address spaces from one another.) A network node is addressed by using an IP address. Some devices, such as multi-homed servers, can be addressed via any one of multiple IP addresses. In this situation, each IP address is treated as a separate network node. Thus, a single device can "house" multiple network nodes.

The assetID field is intended to store a unique identifier (ID) that is assigned to a network node. When an event is first received by the manager, the assetID field of a node reference is empty. Later, an identifier corresponding to the node's "asset model" is stored in the assetID field. In one embodiment, the ID is used to obtain the asset model corresponding to the network node associated with the ID. In another embodiment, the ID is used to determine whether the network node is a member of a particular category (described below). An asset model is a set of information about a network node. This information can include, for example, the node's IP address, the node's host name, the network to which the node belongs, the node's role within the enterprise, an open port on the node, and software installed on the node (e.g., operating system and applications). In one embodiment, an asset model includes a list of known vulnerabilities or weaknesses of the node, called "exposed vulnerabilities." A vulnerability is generally defined as a configuration or condition of a node that can be exploited to cause an effect other than that intended by the node's manufacturer.

The manager 14 accesses a network node's asset model in order to perform security analysis. For example, an event can describe an attempt to exploit one or more known vulnerabilities, called "exploited vulnerabilities." The manager 14 can determine the target node's exposed vulnerabilities (by accessing the node's asset model) and then compare them to the exploited vulnerabilities. A threat is detected if a vulnerability appears as both an exposed vulnerability and an exploited vulnerability. Threat detection is further described in U.S. Pat. No. 7,260,844, issued Aug. 21, 2007, which is hereby incorporated by reference herein in its entirety.

As another example, consider a standard within the Federal Information Processing Standards (FIPS) that requires categorization of a node according to its tolerance for confidentiality. An event can describe an action that might void confidentiality on a particular node. The manager 14 can notice this event and determine how critical confidentiality is for that node (by accessing the node's asset model). If confidentiality is critical, then a trouble ticket can be created to track the violation.

A network node (asset) can be categorized in order to describe its properties. A category is implemented as a "group." For example, in order to specify that a particular node is running the Windows 2003 Server operating system, the node's asset is placed in the group "/AllCategories/OperatingSystems/Microsoft/Windows/2003Server." Categories can be hierarchical. For example, "2003 Server" is a child of the category "Windows," which is a child of the category "Microsoft," and so forth. Another example of hierarchical categories is geographical classifications (e.g., continent/country/state/region/ . . . ).

Given a node reference and a category, the manager 14 can determine whether the node is a member of (i.e., within) that category. An asset group can also be categorized, as can a network zone and a network zone group.

Security analysis thus includes identifying and accessing an asset model and checking for category membership. In order for security analysis to be performed in real-time (or near real-time), the model identification and access and category checks should also be performed in real-time (or near real-time). This is very difficult to achieve, since thousands of events are generated per minute, and each event indicates one or more node references. For example, an event rate of 5,000 events/second and 4 node references/event results in 20,000 node references/second. For each node reference, its asset model is identified and accessed and several category membership checks are performed.

Manager Architecture

Figure 2:
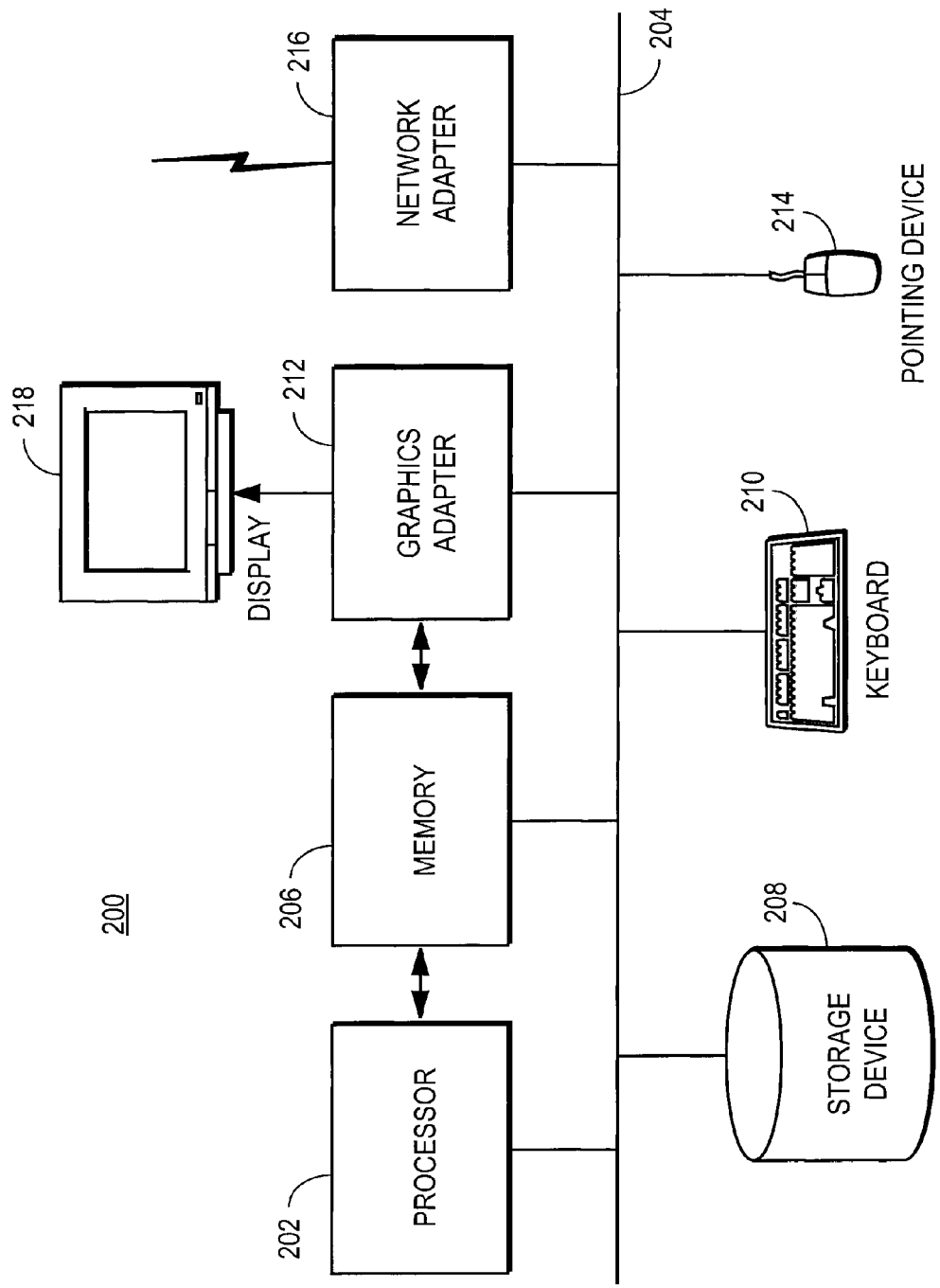
FIG. 2 is a high-level block diagram of a computer for acting as a manager of a security information/event management system, according to one embodiment.

FIG. 2 is a high-level block diagram of a computer 200 for acting as a manager 14 of a security information/event management system 10 according to one embodiment. Illustrated are at least one processor 202 coupled to a bus 204. Also coupled to the bus 204 are a memory 206, a storage device 208, a keyboard 210, a graphics adapter 212, a pointing device 214, and a network adapter 216. In one embodiment, the functionality of the bus 204 is provided by an interconnecting chipset. A display 218 is coupled to the graphics adapter 212.

The storage device 208 is any device capable of holding data, like a hard drive, compact disk read-only memory (CD-ROM), DVD, or a solid-state memory device. The memory 206 holds instructions and data used by the processor 202. The pointing device 214 may be a mouse, track ball, or other type of pointing device, and is used in combination with the keyboard 210 to input data into the computer 200. The graphics adapter 212 displays images and other information on the display 218. The network adapter 216 couples the computer 200 to a local or wide area network.

As is known in the art, a computer 200 can have different and/or other components than those shown in FIG. 2. In addition, the computer 200 can lack certain illustrated components. For example, a computer 200 acting as a manager 14 can lack a keyboard 210, pointing device 214, graphics adapter 212, and/or display 218. Moreover, the storage device 208 can be local and/or remote from the computer 200 (such as embodied within a storage area network (SAN)).

A software agent 12 (e.g., a SmartConnector from ArcSight, Inc., of Cupertino, Calif.) receives, from a sensor, a message regarding a network node. The agent 12 then processes the message to create an event. In one embodiment, an event represents a data structure that includes one or more fields, where each field can contain a value. A field's value is determined based on the message received from the sensor. The agent sends the event to a manager 14 (e.g., the Enterprise Security Manager from ArcSight, Inc.) for storage and analysis.

The manager 14 includes a module called an Event Asset Resolver (EAR) (not shown). Recall that an event can include a node reference The EAR module associates this node reference with its corresponding asset model and tags the node reference with a unique identifier (ID). For example, the EAR module modifies the event by storing the ID in the node reference's assetID field, which was previously empty. In one embodiment, an event includes references to four nodes: source of network traffic, destination of network traffic, host of agent, and host of sensor that reported event. For each node reference, the EAR module associates the node reference with its corresponding asset model and tags the node reference with a unique ID.

Figure 3:
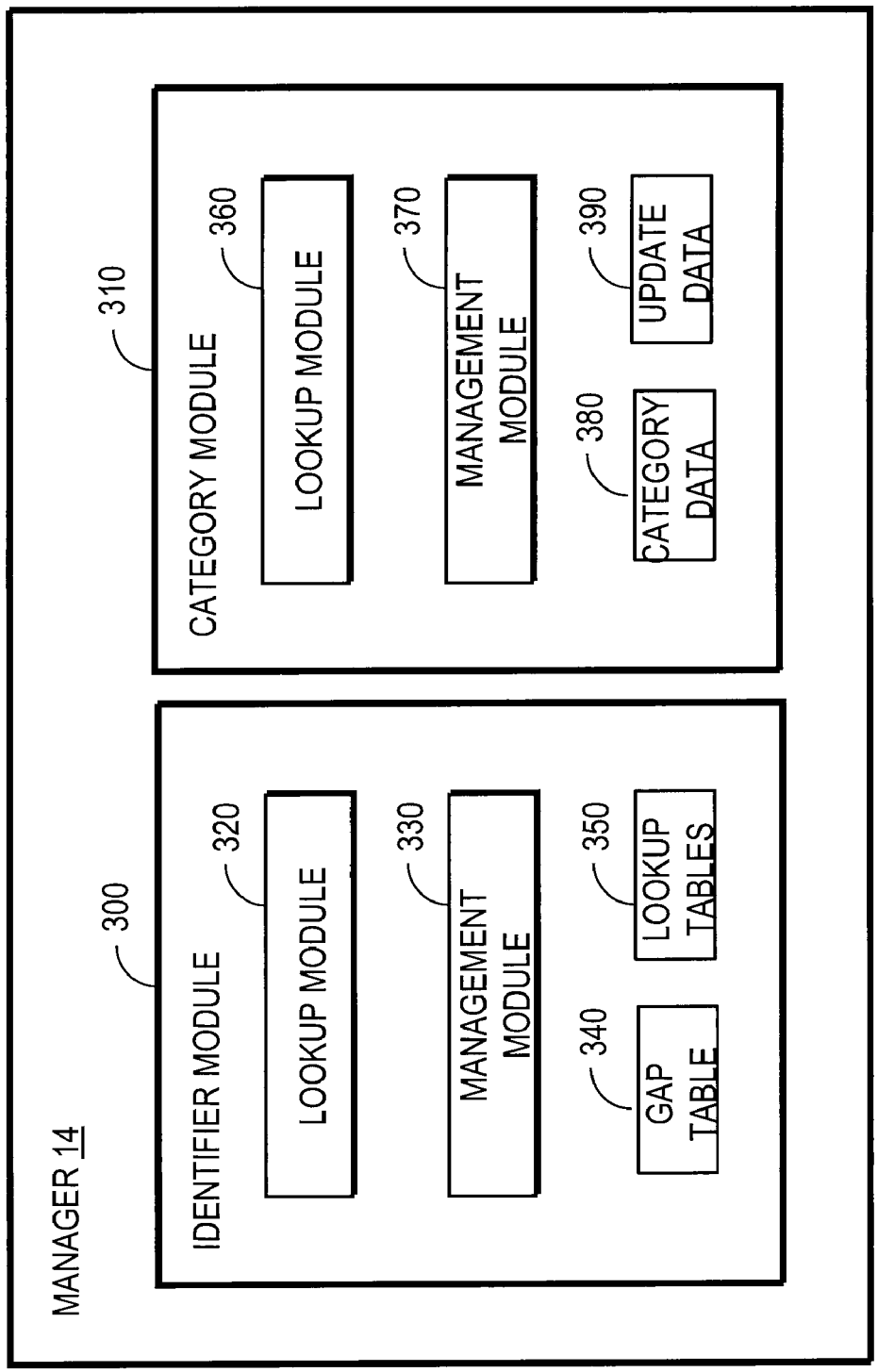
FIG. 3 is a high-level block diagram illustrating modules within a manager of a security information/event management system according to one embodiment.

FIG. 3 is a high-level block diagram illustrating modules within a manager 14 of a security information/event management system 10 according to one embodiment. As shown in FIG. 3, an embodiment of a manager 14 includes an identifier module 300 and a category module 310. Other embodiments can have different and/or additional modules than the ones shown in the figure. For example, the manager 14 can contain the modules illustrated in FIG. 1, although FIG. 3 omits these modules for clarity. In addition, the functions can be distributed among the modules in a different manner than is described here.

The identifier module 300 provides functionality related to a unique identifier (ID) that is assigned to a network node. In one embodiment, an ID is integer-based (e.g., a value expressed in the primitive data type "int"). In one embodiment, an ID is "locally" unique. For example, it is unique within a particular manager 14 but not necessarily unique across multiple managers. In another embodiment, an ID is a Universally Unique Identifier (UUID) or a Globally Unique Identifier (GUID). In this embodiment, an ID is "globally" unique. For example, it is unique across multiple managers. The amount of memory required to store a UUID or GUID is at least 16 bytes. Less memory is required to store an integer-based value. Since over one million IDs might need to be stored in memory simultaneously, this memory difference is significant.

In one embodiment, the ID is used to obtain an asset model corresponding to the network node associated with the ID. For example, an asset management module (not shown) maintains asset model information and returns an asset model when queried using an ID. An asset model is represented by, for example, an object data structure (e.g., in an object-oriented programming language such as Java). In another embodiment, the ID is used to determine whether the network node is a member of a particular category.

In the illustrated embodiment, the identifier module 300 includes a lookup module 320, a management module 330, a gap table 340, and one or more lookup tables 350. The lookup module 320 determines a network node's ID based on various characteristics of the network node. These characteristics are present in the node reference within the event, as described above. The ID of a particular network node is determined based on the node's IP address, host name, network zone, and/or Media Access Control (MAC) address. In one embodiment, these pieces of information are used as keys into one or more lookup data structures (lookup tables 350, described below). If a lookup is successful (e.g., a value is found that is associated with the key), then that value (which is the ID of the node's asset model) is returned.

Figure 4:
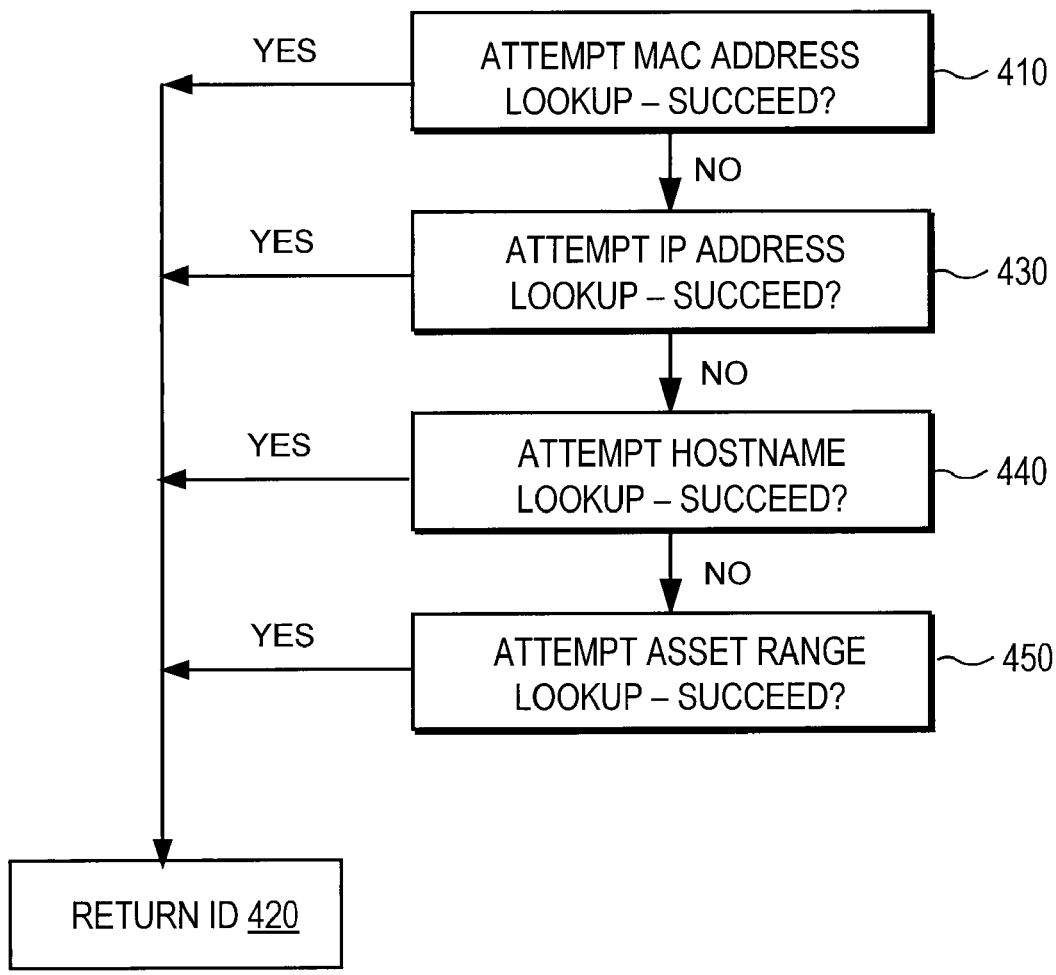
FIG. 4 is a flowchart showing a method of determining an identifier associated with a network node according to one embodiment.

FIG. 4 is a flowchart showing a method of determining an identifier associated with a network node according to one embodiment. Before the method 400 begins, information about a network node is received. This information includes one or more of the following: the node's IP address, network zone, host name, and MAC address.

A lookup is attempted 410 using the node's MAC address. If this results in a successful match, then the ID is returned 420. If the MAC lookup does not result in a successful match, then a lookup is attempted 430 using the node's IP address and network zone. If this results in a successful match, then the ID is returned 420. If the IP lookup does not result in a successful match, then a lookup is attempted 440 using the node's host name and network zone. If this results in a successful match, then the ID is returned 420. If the host name lookup does not result in a successful match, then a lookup is attempted 450 using an asset range that covers the node's IP address within the node's network zone. If this results in a successful match, then the ID is returned 420. In one embodiment, the order in which each lookup is attempted (MAC lookup, IP lookup, hostname lookup, and asset range lookup) is configurable.

The lookup tables 350 are used by the lookup module 320 to determine a network node's ID based on various characteristics of the network node. In one embodiment, there are four types of lookup tables 350: IP address/network zone lookup tables, host name/network zone lookup tables, MAC address lookup tables, and asset range lookup tables. Each of these lookup tables is populated by the asset management module (described above).

IP Address/Network Zone Lookup

In one embodiment, an IP address lookup table uses keys and values of the primitive data type "int" (integer). A key, which is used to perform a lookup, is a 32-bit integer that represents an IP address. The value, which is returned by a lookup, is the integer ID of the corresponding asset model. Since IP addresses are unique only within a network zone, each network zone has its own IP lookup table.

In one embodiment, the lookup table is customized and optimized to exhibit low memory usage and/or high speed. The customized table can be either a hash map or an array.

Figure 5:
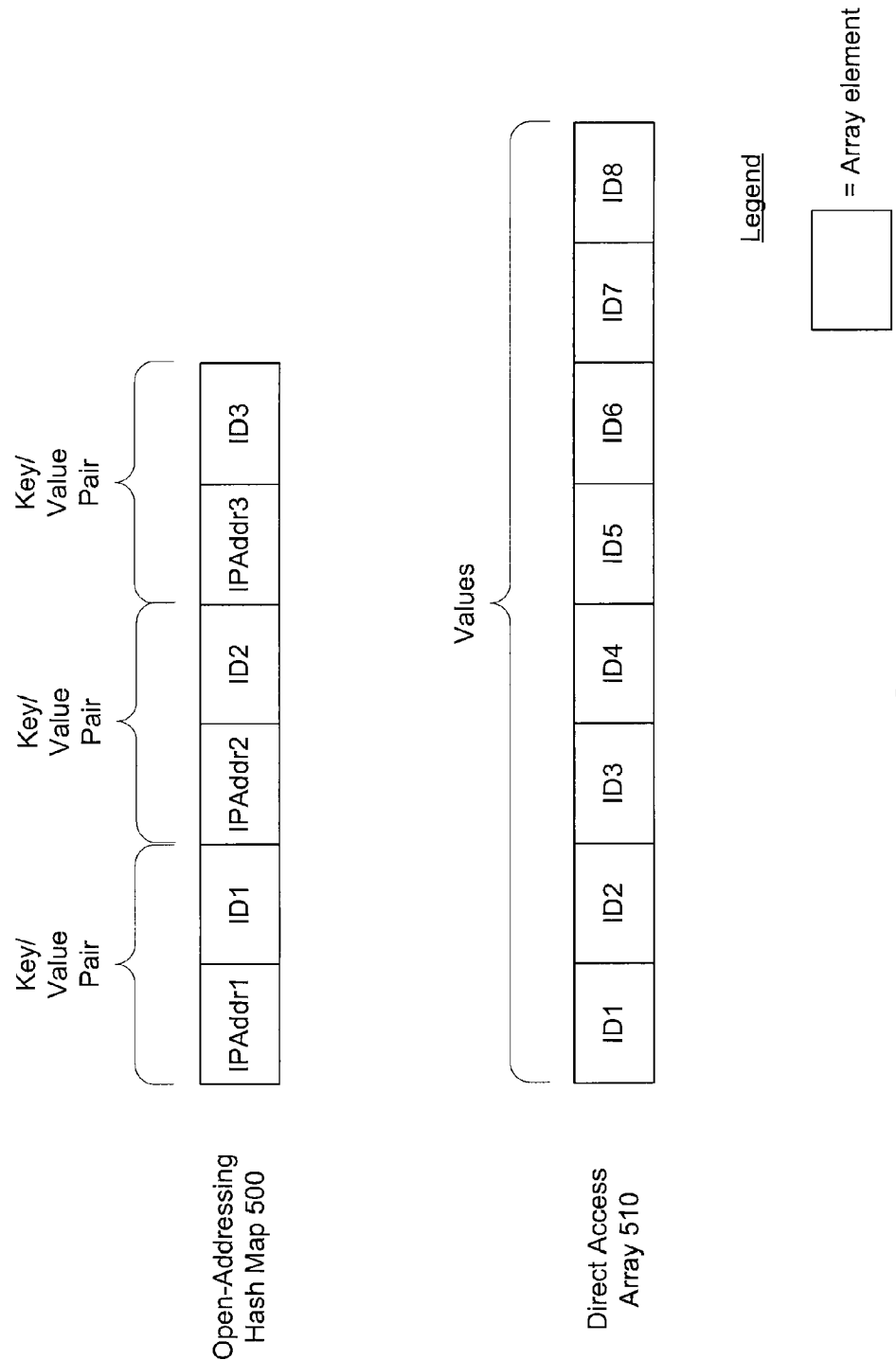
FIG. 5 shows exemplary data structures for an IP address lookup table.

FIG. 5 shows exemplary data structures for an IP address lookup table. The illustrated data structures include an open-addressing hash map 500 and a direct access array 510. In traditional implementations of open-addressing hash maps, three arrays are used: one to store keys, one to store values, and one to indicate whether the key-value pairs are valid. Here, keys (IP addresses) and values (IDs) are stored together in a single integer array 500. In the illustrated embodiment, a key and its associated value are placed near each other (e.g., next to each other) in the array for better cache locality. In other words, an open-addressing hash map is implemented using one array by interleaving the values of a key array and a value array. Implementation of an open-addressing hash map using a single array is known to those of ordinary skill in the art and is described in the Data Structures/Hash Tables Wikibook at http://en.wikibooks.org/wiki/Data_Structures/ Hash_Tables.

Certain IP addresses may not be valid within a network zone. In one embodiment, an invalid address is used in a lookup data structure to indicate that the corresponding value (here, an ID) is empty.

Alternatively, a direct access array 510 can be used, where each value (here, an ID) is stored as one element of the array. The index of that element within the array is determined based on the key (here, an IP address). In one embodiment, an index is equal to the offset of an IP address within a particular address range. For example, consider a network zone that includes IP addresses that range from 192.168.0.100 to 192.168.0.200. The IP address 192.168.0.150 would have an index equal to 50, since its offset is 50 from the lower end of the range. Thus, its ID would be stored at array[50], where array is the name of the array, and 50 is the index into the array. In this way, a key does not have to be stored. Instead, it is translated to an index, which is then used to access a particular element of the array.

Consider another network zone and its range of IP addresses (e.g., 192.168.0.0 to 192.168.0.255). If IP addresses within the range are densely populated (as should be the case), then a direct array is used. This offers faster lookup while saving memory because the IP addresses don't need to be explicitly stored in the lookup table.

If IP addresses are only sparsely populated within a network zone, using direct array lookup has significant memory overhead, and a hash map is used instead. In one embodiment, the type of internal data structure used for the IP address lookup table is based on IP address usage (e.g., density of population) within IP addresses associated with the network zone. The data structure can be switched between array lookup 510 and hash lookup 500 as necessary (e.g., if IP address population density changes).

Host Name/Network Zone Lookup

Since host names are unique only within a network zone, each network zone has its own host name lookup table. In one embodiment, the lookup table is customized and optimized to exhibit low memory usage and/or high speed.

Figure 6:
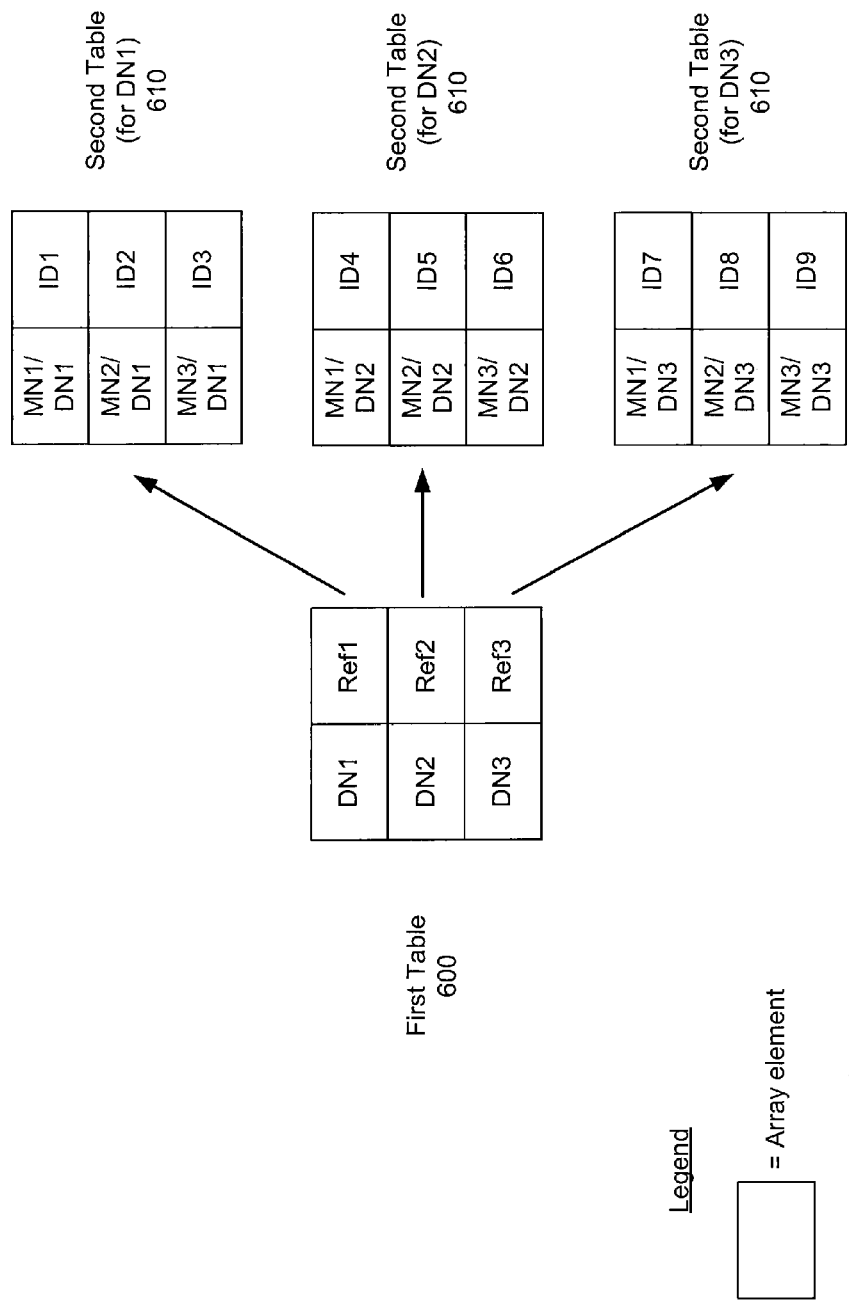
FIG. 6 shows two lookup tables that are used to perform host name lookup.

In one embodiment, host name lookup is performed using two lookup tables. Each lookup table can be implemented as either a hash map or an array. FIG. 6 shows two lookup tables that are used to perform host name lookup. For simplicity, the lookup tables are illustrated in row/column format, where each row represents a key/value pair.

A host name is divided into two parts: machine name and domain name. For example, the host name "test.arcsight-.com" is divided into "test" (machine name) and "arcsight-.com" (domain name). A first lookup table 600 uses keys of the primitive data type "string" and values of the primitive data type "int" (integer). A key, which is used to perform a lookup, is a string (illustrated as "DN1") that represents a domain name. The value, which is returned by a lookup, is an integer reference (illustrated as "Ref1") to a second table 610 that is associated with that domain name. This avoids wasting memory space by storing multiple copies of the same domain name.

A second lookup table 610 uses keys and values of the primitive data type "int" (integer). A key, which is used to perform a lookup, is an integer (illustrated as "MN1/DN1") that represents a machine name and a domain name (see below for exemplary implementation). The value, which is returned by a lookup, is the integer ID (illustrated as "ID1") of the corresponding asset model.

In one embodiment, a key for the second lookup table 610 is based on an integer hash of the machine name and the integer reference of the domain name (e.g., as stored in the domain name table). In one embodiment, a machine name is stored as a UTF-8 (8-bit UCS/Unicode Transformation Format) byte array for compact storage. In Java, a character is encoded as UTF-16, which requires 2 bytes of memory per character. UTF-8 encoding requires only 1 byte per character if the machine name contains only ASCII characters, which should be the case most of the time. (DoD Internet Host Table Specification (RFC 952) specifies that a host name should contain only ASCII characters.)

In traditional implementations of open-addressing hash maps, three arrays are used: one to store keys, one to store values, and one to indicate whether the key-value pairs are valid. Here, for the second lookup table 610, keys (integers that represent a machine name and a domain name) and values (IDs) are stored together in a single integer array. A key and its associated value are placed near each other (e.g., next to each other) in the array for better cache locality. In other words, an open-addressing hash map is implemented using one array by interleaving the values of a key array and a value array.

In one embodiment, the second lookup table 610 is implemented by using one integer array for each table entry (e.g., one array per host name). This array includes the machine name UTF-8 byte array, the machine name's hash code, the domain name reference, and the associated ID. Since objects are not used, the overhead associated with them is avoided, which further reduces memory usage. Also, cache locality is improved, which increases performance.

In open-addressing hash maps, a hash is computed, the entry at that point is fetched, and the key is tested to determine whether there is a hit. Here, the domain name is used with the first table 600 to obtain the domain name reference. In one embodiment, in order to optimize the key check, the obtained reference (an integer) is compared to the reference stored in the entry (also an integer). Then, a hash of the machine name (an integer, which was computed as part of computing the hash for this lookup) is compared to the hash stored in the entry (also an integer). Finally, the machine name string is compared to the string stored in the entry. The value returned is the integer ID of the asset model associated with the given host name.

MAC Address Lookup

The MAC address lookup table uses keys of the primitive data type "long" (long integer) and values of the primitive data type "int" (integer). A key, which is used to perform a lookup, is a 64-bit integer that represents a MAC address. The value, which is returned by a lookup, is the integer ID of the corresponding asset model. Since MAC addresses are globally unique, only one MAC lookup table is used.

In one embodiment, the lookup table is customized and optimized to exhibit low memory usage and/or high speed. The customized table can be either a hash map or an array.

Figure 7:
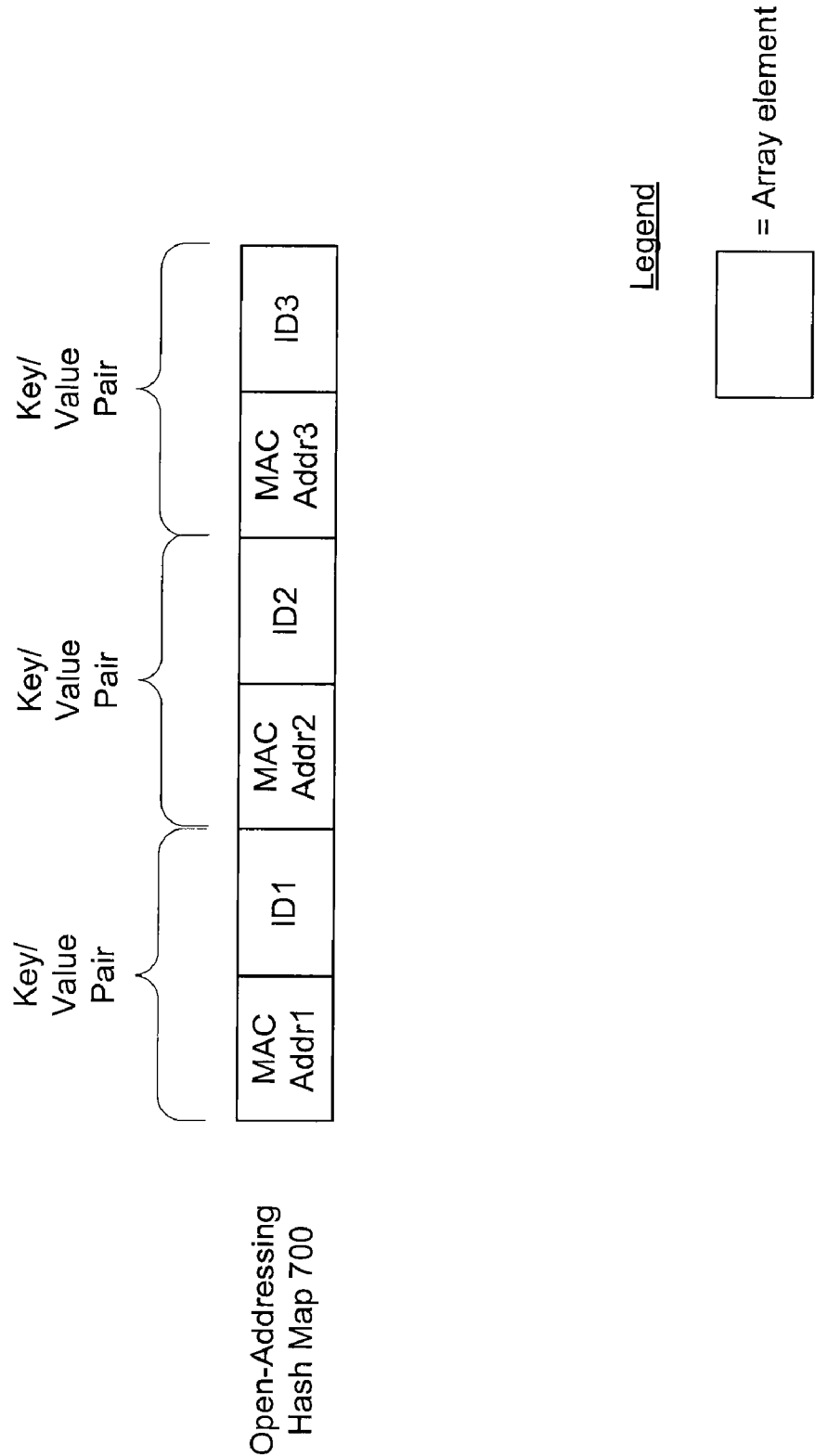
FIG. 7 shows an exemplary data structure for a MAC address lookup table.

FIG. 7 shows an exemplary data structure for a MAC address lookup table. The illustrated data structure is an open-addressing hash map 700. In traditional implementations of open-addressing hash maps, three arrays are used: one to store keys, one to store values, and one to indicate whether the key-value pairs are valid. Here, keys (MAC addresses) and values (IDs) are stored together in a single integer array. A key and its associated value are placed near each other (e.g., next to each other) in the array for better cache locality. In other words, an open-addressing hash map is implemented using one array by interleaving the values of a key array and a value array.

Certain MAC addresses may not be valid. In one embodiment, an invalid address is used in a lookup data structure to indicate that the corresponding value (here, an ID) is empty.

Asset Range Lookup

A key, which is used to perform a lookup, is a pair of IP addresses that together represent a range of IP addresses. The value, which is returned by a lookup, is the integer ID of the corresponding asset model. Since IP addresses are unique only within a network zone, each network zone has its own asset range lookup table. Before the lookup is performed, the IP address in question is examined in order to determine the IP address range that would include that IP address.

The management module 330 tracks which IDs have been assigned to network nodes and which IDs have not. The management module 330 also provides an ID when requested (e.g., to be associated with a new network node). IDs are created close to each other to minimize gaps between them. When network nodes (and their associated asset models) are removed from a system, gaps may start to appear between IDs that are being used. In one embodiment, the management module 330 manages gaps between IDs as follows: At the time of initial load, a table of gaps (gap table 340) is created. When a new network node is added (and thus a new asset model created), an ID is assigned. If a gap exists, an existing ID within a gap is used. If a gap does not exist, then a new ID is created and used.

The gap table 340 is used by the management module 330 to manage gaps between IDs, as described above.

The category module 310 provides functionality related to categories. Recall that an asset can be categorized in order to describe its properties. A category is implemented as a "group." For example, in order to specify that a particular node is running the Windows 2003 Server operating system, the node's asset is placed in the group "/AllCategories/OperatingSystems/Microsoft/Windows/2003Server." Categories can be hierarchical. For example, "2003Server" is a child of the category "Windows," which is a child of the category "Microsoft," and so forth. Another example of hierarchical categories is geographical classifications (e.g., continent/country/state/region/ . . . ). An asset group can also be categorized, as can a network zone and a network zone group.

In the illustrated embodiment, the category module 310 includes a lookup module 360, a management module 370, category data 380, and update data 390. The lookup module 360 determines whether a particular network node (asset) is a member of (i.e., within) a particular category. For example, a question might be "Is this Asset a member of this Category or any descendent Category?" In order to make this determination, the category module 310 uses the category data 380.

The category data 380 uses a transitive closure (TC) to model a hierarchical and dynamic space of categorization (properties) that can be attached to an asset model. A TC is basically a directed acyclic graph (DAG) where a link could exist between each ancestor (a category or group) and each descendant (an asset). The existence of a link indicates that the descendant asset is a member of the ancestor category or group or a member of any of the ancestor's descendent categories or groups. The link is built on top of the parent-child links that already exist in the DAG. The presence of the TC links enables O(1) efficiency of time to check whether a given child (asset) is a descendant of any given parent (category or group).

Consider the category hierarchy described above: AllCategories/OperatingSystems/Microsoft/Windows/2003Server. Often, knowing whether a network node is running the 2003 Server operating system is less interesting than knowing whether the node is running a Microsoft operating system in general (e.g., of any sort). If no link exists between the "Microsoft" category and the node, a tree walk would have to be performed. For example, a walk could start at the Microsoft category and search downward among descendants for a match. Alternatively, a walk could start at the network node and search upward. A tree walk takes an unpredictable amount of time and is theoretically always more expensive than an O(1) lookup against a complete list of links between all ancestors and all descendants (i.e., a transitive closure). The disadvantage of using a TC is that it requires storing a lot of information. For example, the number of ancestor-descendent links is exponentially larger than the number of parent-child links.

The data structure that represents the transitive closure will be used for real-time lookup at speeds of 5,000 events per second and 4 node references per event and 100 category membership checks per node reference (for a total of 2,000,000 checks per second). If the data structure is stored in secondary storage or cached in a traditional manner (e.g., least recently used—LRU), performance of category checks will be neither fast nor predictable. In one embodiment, the TC data structure is stored in memory in an indexed fashion so that category membership checks can be performed quickly.

In one embodiment, the transitive closure is stored in memory as a set of bitmaps, where a bitmap is an array of bits, and each bit stores a Boolean value. This is similar to bitmap indexing. Here, a bitmap corresponds to a particular asset category or group. A 0/1 bit in a bitmap represents whether there is a link between the particular asset category/group and an asset. If there are 1 million assets and 1,000 asset categories/groups, there are potentially 1 million*1,000=1 billion bits of storage that are required. Recall that an asset model is identified by an ID, which is an integer value. In one embodiment, this ID serves as an index into a transitive closure bitmap.

An asset is usually categorized in approximately thirty categories of a total 1,000 categories. Thus, the probability that a particular asset is in a particular category is 30/1, 000=3%. This means that about 3% of the bits in a bitmap are set (i.e., have values that are different from others). Thus, a bitmap will be very sparse. In one embodiment, a bitmap is compressed using a technique such as Word-Aligned Hybrid in order to reduce memory requirements.

When performing a category check, it is faster to use an uncompressed bitmap than a compressed bitmap. In one embodiment, bitmaps for categories that are checked more frequently are stored in uncompressed form, while bitmaps for categories that are checked less frequently are stored in compressed form. This enables extremely fast category checks for a majority of checks at a small cost of additional memory requirements, thereby increasing the average category check performance.

The management module 370 updates category data 380 as necessary. Over time, asset models can change, and the transitive closure data structure should be updated. If a bitmap is compressed, updating it includes uncompressing it, applying the update, and compressing it again. In one embodiment, updates are applied immediately to the relevant bitmaps, whether or not they are compressed.

In another embodiment, if a bitmap is compressed, it is not updated immediately. Instead, the update is temporarily stored (in update data 390) and applied later in conjunction with other updates to the same bitmap (e.g., via a task that runs periodically, such as once per minute). Since uncompressing and compressing a bitmap takes time, it is faster to uncompress the bitmap one time, perform multiple updates, and then compress the bitmap. In this embodiment, when a category check is requested that involves a compressed bitmap, the temporary update storage (update data 390) is accessed to determine whether any updates exist. If the lookup fails in the temporary update storage (which is small and therefore supports fast lookups), then a lookup is performed on the compressed bitmap. If a bitmap is uncompressed, it is updated immediately.

The update data 390 is used by the management module 370 to delay updating the category data 380, as described above.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A computer-implemented method for determining a unique identifier associated with a network node, comprising:
using a processor to query an Internet Protocol (IP) address lookup data structure using an IP address associated with the network node, wherein the IP address lookup data structure comprises an array comprising one or more elements, an element stored at an index, the element comprising a unique identifier associated with a particular network node, the index being determined based on an IP address associated with the particular network node;
returning the unique identifier associated with the network node; and
performing one of:
using the returned unique identifier to obtain an asset model associated with the network node; and
using the returned unique identifier to determine whether the network node is a member of a category.

2. The computer-implemented method of claim 1, wherein using the processor to query the IP address lookup data structure using the IP address associated with the network node comprises using a processor to determine an index based on the IP address associated with the network node.

3. The computer-implemented method of claim 1, wherein the IP address lookup data structure is configured to automatically change from an array-based implementation to a table-based implementation.

4. A computer-implemented method for determining a unique identifier associated with a network node, comprising:
using a processor to query a first lookup table using a domain name associated with the network node, the first lookup table comprising one or more pairs, a pair comprising a domain name associated with a particular network node and a reference to one second lookup table of a set of multiple second lookup tables, each second lookup table comprising one or more pairs, a pair comprising a hostname associated with a particular network node and a unique identifier associated with the particular network node;
querying the referenced second lookup table using a hostname associated with the network node;
returning the unique identifier associated with the network node; and
performing one of:
using the returned unique identifier to obtain an asset model associated with the network node; and
using the returned unique identifier to determine whether the network node is a member of a category.

5. The computer-implemented method of claim 4, wherein the unique identifier associated with the network node is a value of the primitive data type "int" (integer).

6. The computer-implemented method of claim 4, wherein using the returned unique identifier to determine whether the network node is the member of the category comprises:
identifying a transitive closure, the transitive closure including one or more links between ancestor nodes and descendent nodes, an ancestor node representing a category, a descendent node representing a network node, a link indicating that a descendant node is a member of an ancestor node;
querying the transitive closure using the returned unique identifier and the category; and
returning a Boolean value that indicates whether the network node is the member of the category.

7. The computer-implemented method of claim 6, wherein querying the transitive closure using the returned unique identifier and the category comprises determining whether a link exists between a descendant node associated with the returned unique identifier and an ancestor node associated with the category.

8. The computer-implemented method of claim 4, wherein using the returned unique identifier to determine whether the network node is the member of the category comprises:

identifying a bitmap associated with the category, the bitmap comprising a plurality of bits, a bit value indicating whether a network node is a member of the category;

querying the bitmap using the returned unique identifier; and returning a Boolean value that indicates whether the network node is the member of the category.

9. The computer-implemented method of claim 8, wherein querying the bitmap using the returned unique identifier comprises:

identifying a bit within the bitmap by using the returned unique identifier as an index into the bitmap; and returning the value of the identified bit.

10. A computer program product for determining a unique identifier associated with a network node, the computer program product comprising a computer-readable medium containing computer program code for performing a method, the method comprising:

querying an Internet Protocol (IP) address lookup table using an IP address associated with the network node, the IP address lookup table comprising one or more pairs, a pair comprising an IP address associated with a particular network node and a unique identifier associated with the particular network node;

returning the unique identifier associated with the network node; and performing one of:

using the returned unique identifier to obtain an asset model associated with the network node; and using the returned unique identifier to determine whether the network node is a member of a category;

wherein the IP address lookup table is automatically converted to an array comprising one or more elements, an element stored at an index, the element comprising a unique identifier associated with a particular network node, the index being determined based on an IP address associated with the particular network node.

11. The computer program product of claim 10, wherein the IP address associated with the particular network node is a value of the primitive data type "int" (integer).

12. The computer program product of claim 10, wherein querying the IP address lookup table using the IP address associated with the network node comprises determining a pair that comprises the IP address associated with the network node.

13. The computer program product of claim 10, wherein the table is an open-addressing hash map.

14. The computer program product of claim 10, wherein the table is an open-addressing hash map implemented using only one array.

15. A computer program product for determining a unique identifier associated with a network node, the computer program product comprising a computer-readable medium containing computer program code for performing a method, the method comprising:

querying a first lookup table using a domain name associated with the network node, the first lookup table comprising one or more pairs, a pair comprising a domain name associated with a particular network node and a reference to one second lookup table of a set of multiple second lookup tables, each second lookup table comprising one or more pairs, a pair comprising a hostname associated with a particular network node and a unique identifier associated with the particular network node;

querying the referenced second lookup table using a hostname associated with the network node;

returning the unique identifier associated with the network node; and performing one of:

using the returned unique identifier to obtain an asset model associated with the network node; and using the returned unique identifier to determine whether the network node is a member of a category.

* * * * *